US012521994B2

(12) United States Patent
Katakura et al.

(10) Patent No.: US 12,521,994 B2
(45) Date of Patent: Jan. 13, 2026

(54) LIQUID DISCHARGING HEAD AND LIQUID DISCHARGING APPARATUS

(71) Applicant: SEIKO EPSON CORPORATION, Tokyo (JP)

(72) Inventors: Takahiro Katakura, Okaya (JP); Takanori Aimono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 18/355,256

(22) Filed: Jul. 19, 2023

(65) Prior Publication Data

US 2024/0025181 A1 Jan. 25, 2024

(30) Foreign Application Priority Data

Jul. 21, 2022 (JP) ................................ 2022-116592

(51) Int. Cl.
*B41J 2/175* (2006.01)
*B41J 2/14* (2006.01)

(52) U.S. Cl.
CPC ....... *B41J 2/17596* (2013.01); *B41J 2/14201* (2013.01); *B41J 2/14233* (2013.01); *B41J 2002/14306* (2013.01); *B41J 2002/14419* (2013.01); *B41J 2202/12* (2013.01)

(58) Field of Classification Search
CPC ............... B41J 2/17596; B41J 2/14201; B41J 2/14233; B41J 2002/14306; B41J 2002/14419; B41J 2202/12
See application file for complete search history.

(56) References Cited

U.S. PATENT DOCUMENTS 10,994,543 B2 * 5/2021 Kameshima .......... B41J 2/1404

FOREIGN PATENT DOCUMENTS

JP 2020-199695 A 12/2020

* cited by examiner

*Primary Examiner* — Geoffrey S Mruk
(74) *Attorney, Agent, or Firm* — WORKMAN NYDEGGER

(57) ABSTRACT a first flow path communicating with the first common flow path, the liquid being supplied to the first common flow path through the first flow path; a second flow path communicating with the first common flow path more on one side in the first direction than the first flow path is, the liquid being collected from the first common flow path through the second common flow path; a third flow path communicating with the second common flow path, the liquid being supplied to the second common flow path through the third flow path; and a fourth flow path communicating with the second common flow path more on the other side in the first direction than the third flow path is, the liquid being collected from the second common flow path through the fourth flow path.

12 Claims, 10 Drawing Sheets

LIQUID DISCHARGING HEAD AND LIQUID DISCHARGING APPARATUS

The present application is based on, and claims priority from JP Application Serial Number 2022-116592, filed Jul. 21, 2022, the disclosure of which is hereby incorporated by reference herein in its entirety.

BACKGROUND

1. Technical Field

The present disclosure relates to a liquid discharging head and a liquid discharging apparatus.

2. Related Art

In a technology proposed for a liquid discharging head that is disposed in a liquid discharging apparatus such as an ink jet printer and discharges a liquid such as ink, the liquid is circulated in flow paths formed in the liquid discharging head to prevent a bubble from staying in the liquid filled in the liquid discharging head and also to prevent the liquid from becoming more viscous. JP-A-2020-199695, for example, describes a technology related to a liquid discharging head that has: a plurality of individual flow paths corresponding to a plurality of nozzles; a common supply flow path communicating with one side of the plurality of individual flow paths in common; a common collection flow path communicating with another side of the plurality of individual flow paths in common; two supply ports through which the liquid is supplied to the common supply flow path; and two collection ports through which the liquid is collected from the common collection flow path. After the liquid is supplied from the two supply ports through the common supply flow path to the plurality of individual flow paths, the liquid is collected from the two collection ports through the common collection flow path.

In the technology in related art, however, the individual flow path has a higher flow path resistance than the common supply flow path, so the individual flow path is a rate-limiting factor in the ink flow in the whole of the common supply flow path, individual flow paths, and common collection flow path. Therefore, in the common supply flow path and common collection flow path that have a lower flow path resistance than the individual flow path, the flow rate of ink may become lower than estimated. This has prevented viscous ink from being collected and has also prevented non-viscous ink from being advantageously supplied. As a result, there has been the risk that ink becomes more viscous.

SUMMARY

To address the above problem, a liquid discharging head of the present disclosure has: a plurality of individual flow paths placed in a first direction in correspondence to a plurality of nozzles that discharge a liquid; a first common flow path communicating with one side of the plurality of individual flow paths in common; a second common flow path communicating with another side of the plurality of individual flow paths in common; a first flow path communicating with the first common flow path, the liquid being supplied to the first common flow path through the first flow path; a second flow path communicating with the first common flow path more on one side in the first direction than the first flow path is, the liquid being collected from the first common flow path through the second common flow path; a third flow path communicating with the second common flow path, the liquid being supplied to the second common flow path through the third flow path; and a fourth flow path communicating with the second common flow path more on another side in the first direction than the third flow path is, the liquid being collected from the second common flow path through the fourth flow path.

A liquid discharging apparatus of the present disclosure has: the liquid discharging head described above; and a control device that controls a pressure adjusting device and controls the discharging of the liquid from the liquid discharging head, the pressure adjusting device adjusting pressure in the first flow path, pressure in the second flow path, pressure in the third flow path, and pressure in the fourth flow path.

DESCRIPTION OF EXEMPLARY EMBODIMENTS

Figure 1:
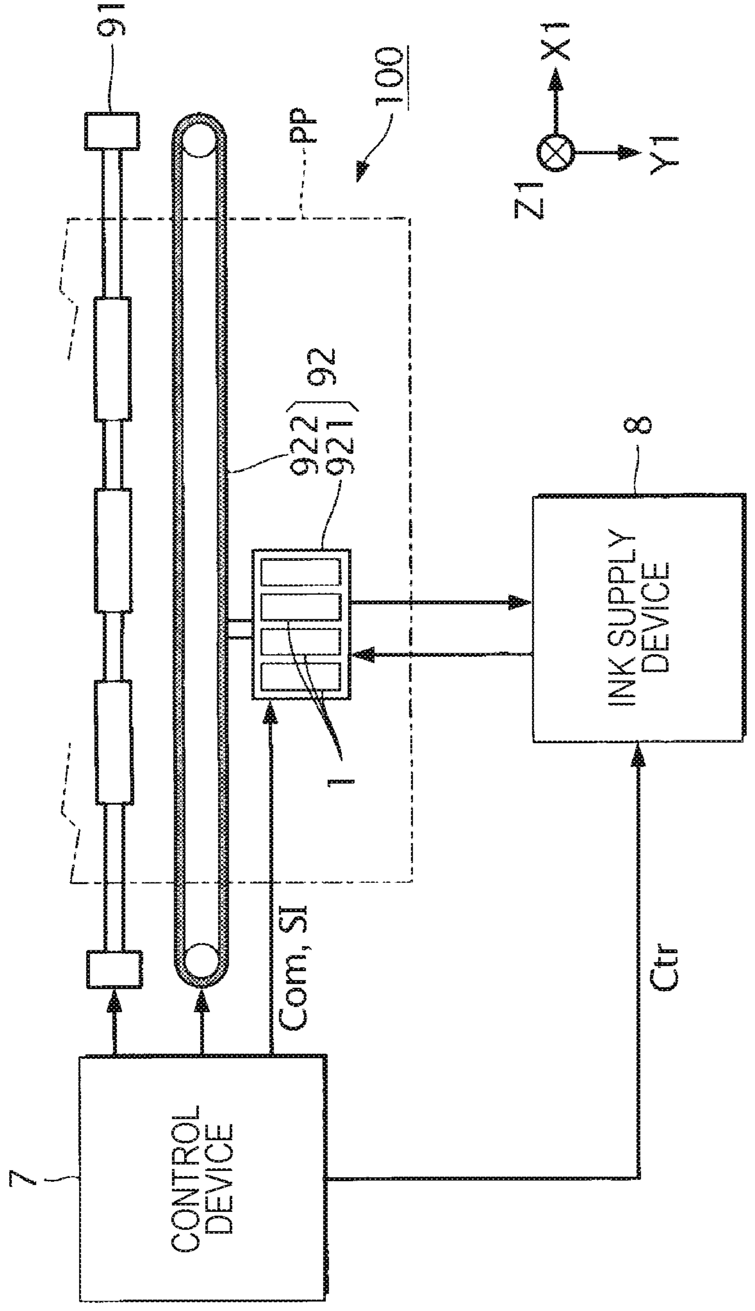
FIG. 1 illustrates an example of the structure of a liquid discharging apparatus according to an embodiment of the present disclosure.

An embodiment of the present disclosure will be described below with reference to the drawings. The dimensions and scales of individual sections and portions in the drawings differ from their actual dimensions and scales, as appropriate. Since the embodiment described below is a preferred specific example in the present disclosure, various limitations that are desirable from a technical viewpoint have been added. However, the scope of the present disclosure is not limited to these forms unless, in the explanation below, there is a particular description that limits the present disclosure.

A. Embodiment

A liquid discharging apparatus 100 according to this embodiment will be described below.

1. Overview of the Liquid Discharging Apparatus

FIG. 1 illustrates an example of the structure of the liquid discharging apparatus 100 according to this embodiment.

The liquid discharging apparatus 100 is an ink jet printing apparatus that discharges ink to a medium PP. The medium PP is typically a print sheet. However, a resin film, a fabric, and any other target eligible for printing can be used as the medium PP. Ink is an example of a liquid.

The liquid discharging apparatus 100 has a plurality of liquid discharging heads 1, a control device 7, an ink supply device 8, a movement mechanism 91, and a transport mechanism 92.

The control device 7 includes a processing circuit such as, for example, a central processing unit (CPU) or a field-programmable gate array (FPGA) and a storage circuit such as a semiconductor memory. The control device 7 controls elements in the liquid discharging apparatus 100.

The movement mechanism 91 transports the medium PP in the Y1 direction along the Y-axis under control of the control device 7. The Y1 direction along the Y-axis and the Y2 direction opposite to the Y1 direction will be collectively referred to below as the Y-axis direction. The X1 direction along the X-axis crossing the Y-axis and the X2 direction opposite to the X1 direction will be collectively referred to below as the X-axis direction. The Z1 direction along the Z-axis crossing the X-axis and Y-axis and the Z2 direction opposite to the Z1 direction will be collectively referred to below as the Z-axis direction. When the inner product of a vector starting from one object and terminating at another object and a vector oriented in the X1 direction is positive, this is represented below as an object being present on the X1 side with respect to one object. Similarly, when the inner product of a vector starting from one object and terminating at another object and a vector oriented in the X2 direction is positive, this is represented below as an object being present on the X2 side with respect to one object. This is also true for the Y1 side, Y2 side, the Z1 side, and Z2 side.

In this embodiment, the X-axis, Y-axis, and Z-axis will be assumed to be mutually orthogonal, as an example. However, the present disclosure is not limited to this type of aspect. The X-axis, Y-axis, and Z-axis only need to cross one another.

The transport mechanism 92 bidirectionally moves the plurality of liquid discharging heads 1 in the X1 direction and X2 direction, under control of the control device 7. The transport mechanism 92 has a storage case 921 in which the plurality of liquid discharging heads 1 are stored, and also has an endless belt 922 to which the storage case 921 is fixed. An ink supply device 8 may be stored in the storage case 921 together with the liquid discharging heads 1.

The control device 7 supplies, to the liquid discharging heads 1, a driving signal Com that drives the liquid discharging heads 1 and a control signal SI that controls the liquid discharging heads 1. Each liquid discharging head 1 is driven in response to the driving signal Com under control of the control signal SI so as to discharge ink in the Z1 direction from part or all of a plurality of nozzles N provided in the liquid discharging head 1. That is, the liquid discharging head 1 discharges ink from part of all of the plurality of nozzles N in conjunction with the transport of the medium PP by the movement mechanism 91 and the bidirectional movement of the liquid discharging heads 1 by the transport mechanism 92, so that the discharged ink lands on the front surface of the medium PP and a desired image is formed on the front surface of the medium PP. The nozzle N will be described below with reference to FIGS. 3 and 4.

The ink supply device 8 holds ink. The ink supply device 8 also supplies ink held in the ink supply device 8 to the liquid discharging heads 1 in response to a control signal Ctr supplied from the control device 7. The ink supply device 8 also collects ink from the liquid discharging heads 1 in response to a control signal Ctr supplied from the control device 7 and causes the collected ink to flow back to the liquid discharging heads 1.

In this embodiment, it will be assumed as an example that the ink supply device 8 holds four types of inks in cyan, magenta, yellow, and black. It will be also assumed as an example that the liquid discharging apparatus 100 has four liquid discharging heads 1 in correspondence to the four types of inks. To simplify the description below, however, attention will be focused on one of the four types of inks held in the ink supply device 8 and on a liquid discharging head 1 corresponding to the one type of ink, the liquid discharging head 1 being one of the four liquid discharging heads 1 included in the liquid discharging apparatus 100.

2. Overview of the Ink Supply Device

The ink supply device 8 will be outlined below with reference to FIG. 2.

Figure 2:
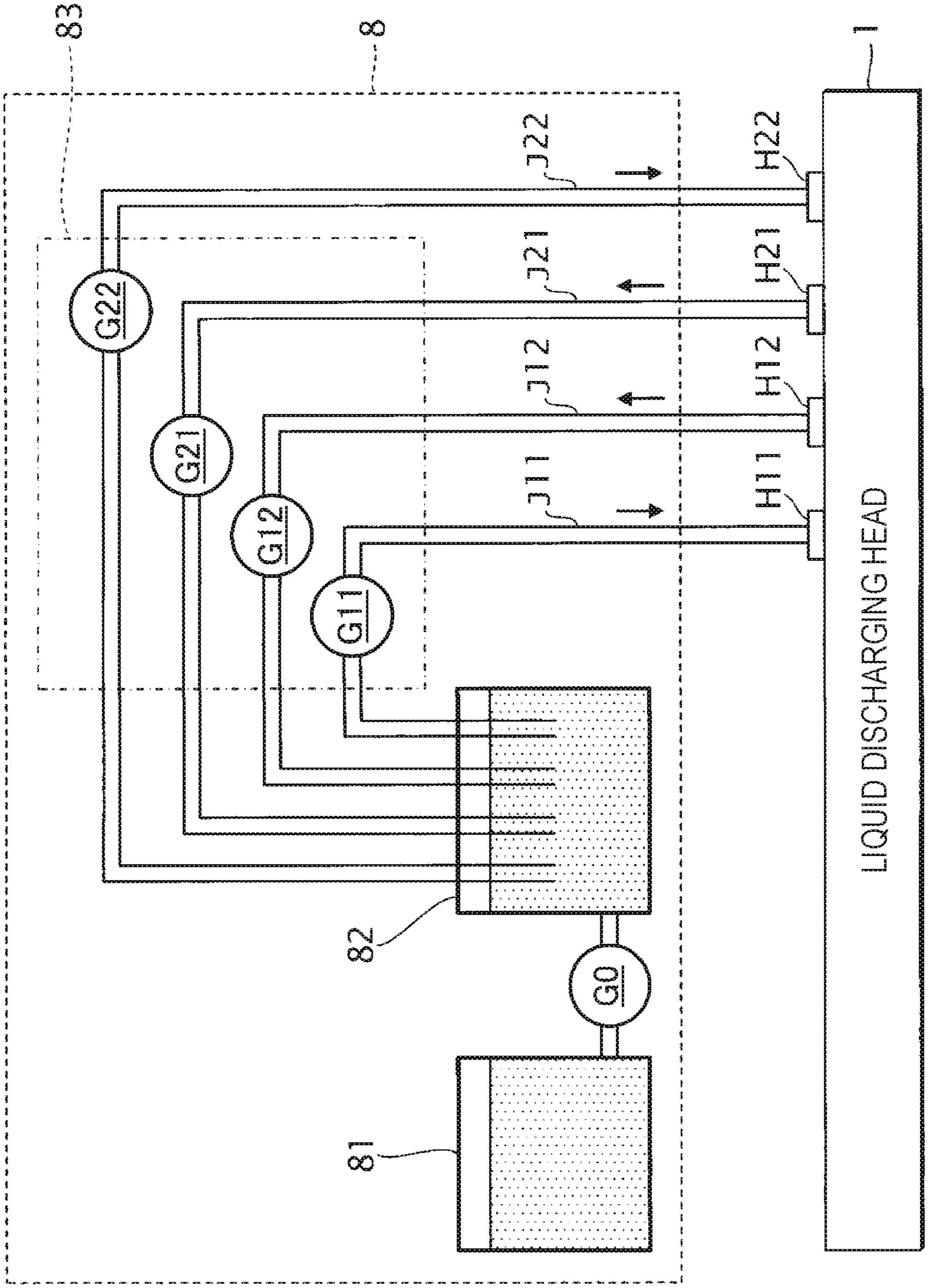
FIG. 2 illustrates an example of the structure of an ink supply device.

FIG. 2 illustrates the ink supply device 8.

As illustrated in FIG. 2, the ink supply device 8 has an ink holding container 81, an ink supply container 82, a pump G0, and a pressure adjusting device 83.

The ink holding container 81 holds ink. Possible examples of the ink holding container 81 include a cartridge attachable to and detachable from the liquid discharging apparatus 100, a bag-shaped ink pack formed from a flexible film, and an ink tank that can be replenished with ink.

The pump G0 supplies ink held in the ink holding container 81 to the ink supply container 82 in response to a control signal Ctr supplied from the control device 7.

The ink supply container 82 temporarily holds ink supplied from the ink holding container 81 and ink collected from the liquid discharging head 1.

The pressure adjusting device 83 has a pump G11, a pump G12, a pump G21, and a pump G22.

The pump G11 supplies ink held in the ink supply container 82 to the liquid discharging head 1 through a circulation flow path J11 in response to a control signal Ctr supplied from the control device 7. The circulation flow path J11 is coupled to a coupling port H11 formed in the liquid discharging head 1. The pump G11 supplies ink to the liquid discharging head 1 through the circulation flow path J11 and coupling port H11.

The pump G12 collects ink from the liquid discharging head 1 through a circulation flow path J12 and supplies the collected ink to the ink supply container 82, in response to a control signal Ctr supplied from the control device 7. The circulation flow path J12 is coupled to a coupling port H12 formed in the liquid discharging head 1. The pump G12 collects ink from the liquid discharging head 1 through the circulation flow path J12 and coupling port H12.

The pump G21 collects ink from the liquid discharging head 1 through a circulation flow path J21 and supplies the collected ink to the ink supply container 82, in response to a control signal Ctr supplied from the control device 7. The circulation flow path J21 is coupled to a coupling port H21 formed in the liquid discharging head 1. The pump G21 collects ink from the liquid discharging head 1 through the circulation flow path J21 and coupling port H21.

The pump G22 supplies ink held in the ink supply container 82 to the liquid discharging head 1 through a circulation flow path J22 in response to a control signal Ctr supplied from the control device 7. The circulation flow path J22 is coupled to a coupling port H22 formed in the liquid discharging head 1. The pump G22 supplies ink to the liquid discharging head 1 through the circulation flow path J22 and coupling port H22.

Although not illustrated, the ink supply device 8 may include a pressure estimating device that estimates pressure to be applied to ink in the circulation flow path J11, pressure to be applied to ink in the circulation flow path J12, pressure to be applied to ink in the circulation flow path J21, and pressure to be applied to ink in the circulation flow path J22. The pressure estimating device may be composed of a sensor that detects pressure to be applied to ink in the circulation flow path J11, a sensor that detects pressure to be applied to ink in the circulation flow path J12, a sensor that detects pressure to be applied to ink in the circulation flow path J21, and a sensor that detects pressure to be applied to ink in the circulation flow path J22. The pressure estimating device may be a computing device that estimates pressure to be applied to ink in the circulation flow path J11 from the operation state of the pump G11, pressure to be applied to ink in the circulation flow path J12 from the operation state of the pump G12, pressure to be applied to ink in the circulation flow path J21 from the operation state of the pump G21, and pressure to be applied to ink in the circulation flow path J22 from the operation state of the pump G22.

In this embodiment, the circulation flow path J11 is an example of a first flow path; the circulation flow path J12 is an example of a second flow path; the circulation flow path J22 is an example of a third flow path; and the circulation flow path J21 is an example of a fourth flow path.

3. Outline of the Liquid Discharging Head

The liquid discharging head 1 will be outlined below with reference to FIGS. 3 to 5.

Figure 3:
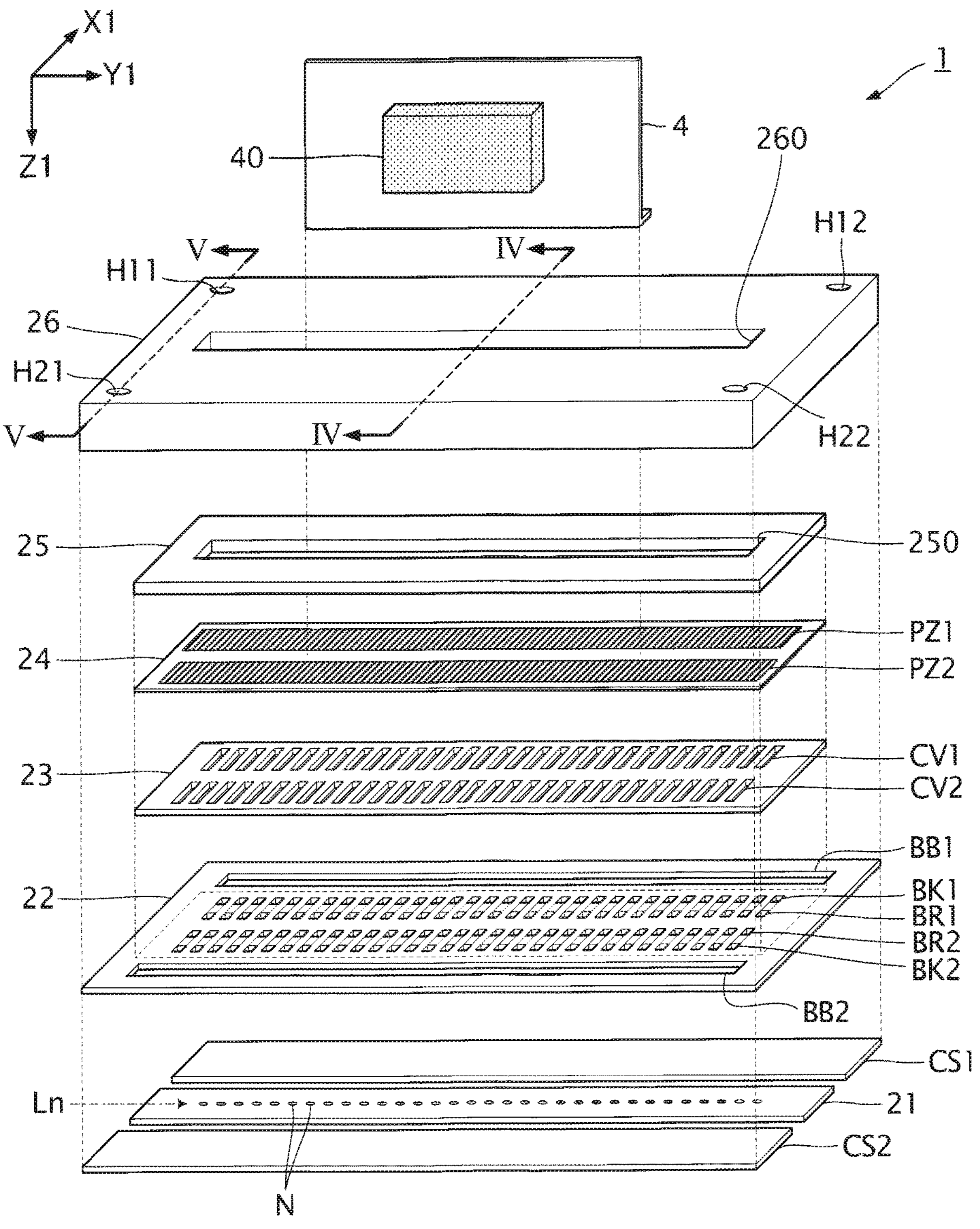
FIG. 3 is an exploded perspective view illustrating an example of the structure of a liquid discharging head.

FIG. 3 is an exploded perspective view illustrating the liquid discharging head 1. FIG. 4 is a sectional view taken along line IV-IV in FIG. 3. FIG. 5 is a sectional view taken along line V-V in FIG. 3.

Figure 4:
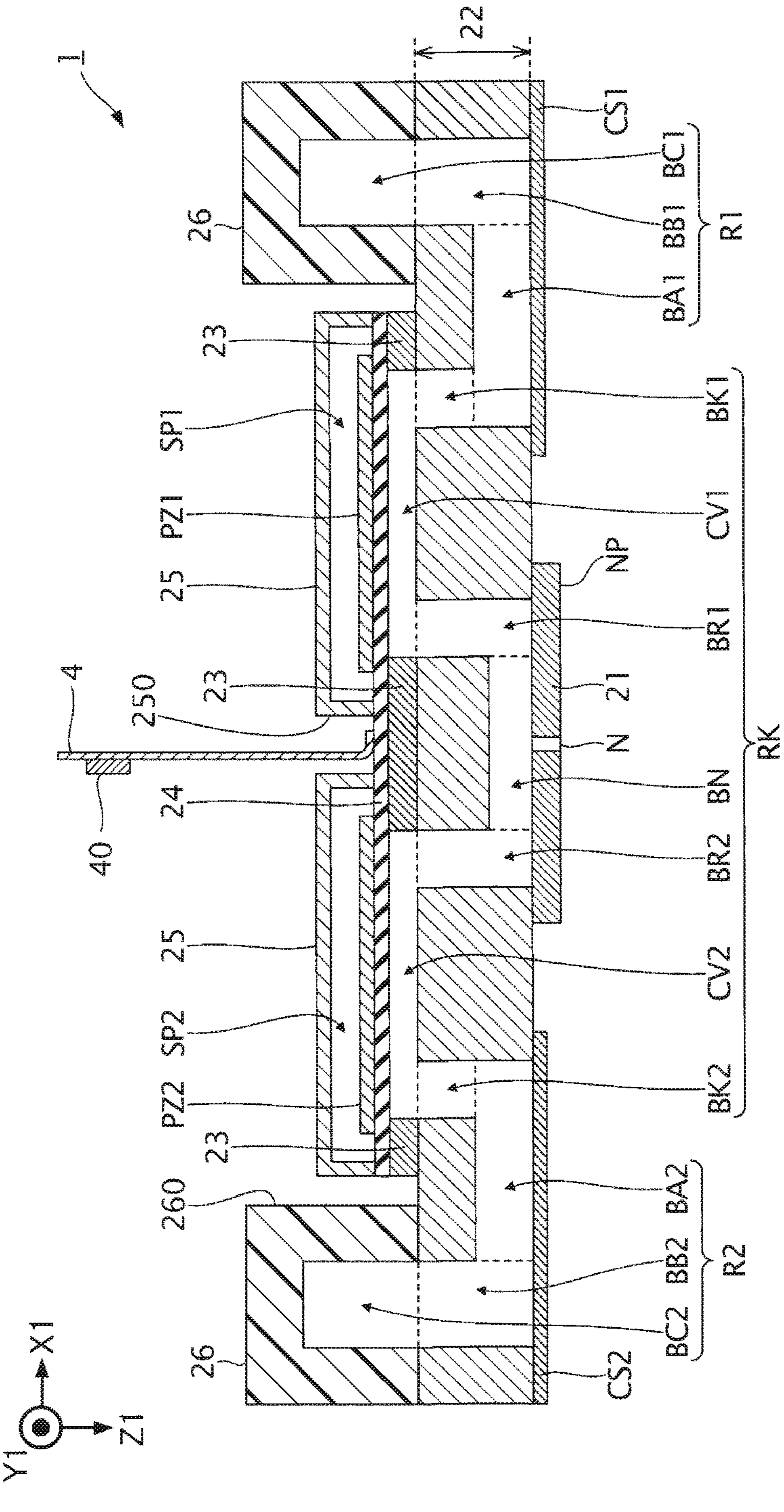
FIG. 4 is a sectional view illustrating the example of the structure of the liquid discharging head.
Figure 5:
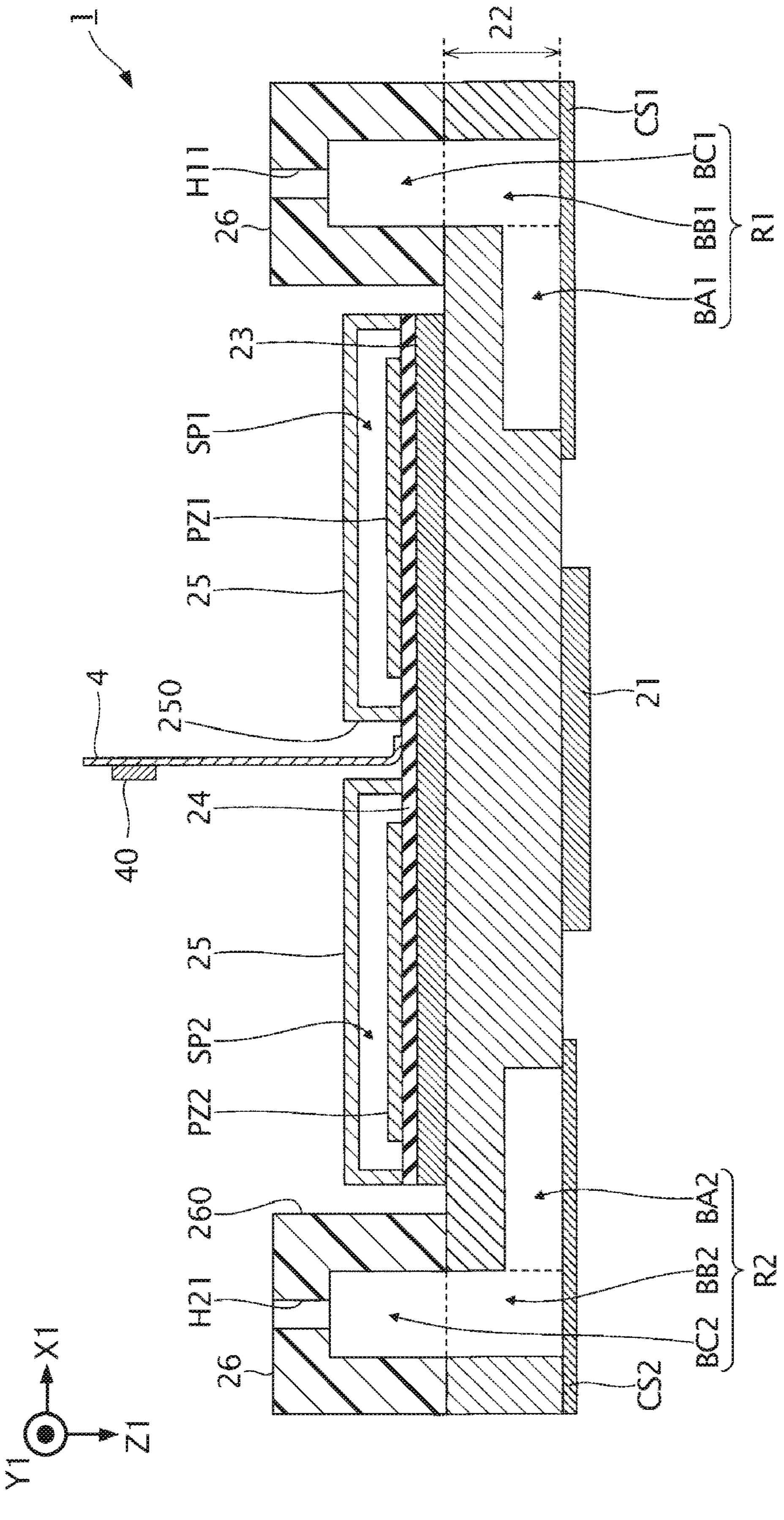
FIG. 5 is another sectional view illustrating the example of the structure of the liquid discharging head.

As illustrated in FIGS. 3 to 5, the liquid discharging head 1 has a nozzle substrate 21, compliance sheets CS1 and CS2, a communication plate 22, a pressure chamber substrate 23, a vibration plate 24, a sealing substrate 25, a flow path forming substrate 26, and a wiring board 4.

As illustrated in FIG. 3, the nozzle substrate 21 is a plate-like member that is elongated in the Y-axis direction and extends substantially in parallel to an XY plane. Here, the phrase "substantially parallel" indicates not only that the nozzle substrate 21 is completely parallel to an XY plane but also that when error is taken into consideration, the nozzle substrate 21 can be regarded to be parallel to an XY plane. In this embodiment, the phrase "substantially parallel" indicates that when an error of about 10% is taken into consideration, the nozzle substrate 21 can be regarded to be parallel to an XY plane. The nozzle substrate 21 is manufactured by, for example, using a semiconductor manufacturing technology such as etching to process a monocrystalline silicon substrate. In the manufacturing of the nozzle substrate 21, however, any known material and any known manufacturing method may be used.

M nozzles N are formed in the nozzle substrate 21, M being a natural number greater than or equal to 2. Each nozzle N is a through-hole formed in the nozzle substrate 21. In this embodiment, it will be assumed that the M nozzles N are arranged in the nozzle substrate 21 so as to extend in the Y-axis direction. In the description below, a row of the M nozzles N extending in the Y-axis direction may be referred to as a nozzle row Ln.

As illustrated in FIGS. 3 to 5, the communication plate 22 is disposed on the Z2 side with respect to the nozzle substrate 21. The communication plate 22 is a plate-like member that is elongated in the Y-axis direction and extends substantially in parallel to an XY plane. The communication plate 22 is manufactured by, for example, using a semiconductor manufacturing technology to process a monocrystalline silicon substrate. In the manufacturing of the communication plate 22, however, any known material and any known manufacturing method may be used.

In the communication plate 22, flow paths for ink are formed.

Specifically, in the communication plate 22, one common flow path BB1 and one common flow path BB2 are formed so as to extend in the Y-axis direction, the common flow path BB2 being on the X2 side with respect to the common flow path BB1. In the communication plate 22, one common flow path BA1 and one common flow path BA2 are also formed so as to extend in the Y-axis direction, the common flow path BA1 being between the common flow path BB1 and the common flow path BB2, the common flow path BA2 being between the common flow path BA1 and the common flow path BB2.

In the communication plate 22, M coupling flow paths BK1, M coupling flow paths BK2, M coupling flow paths BR1, M coupling flow paths BR2, and M nozzle flow paths BN are also formed in correspondence to the M nozzles N.

The coupling flow path BK1 is formed on the X2 side with respect to the common flow path BB1 and on the Z2 side with respect to the common flow path BA1 so as to extend in the Z-axis direction and communicate with the common flow path BA1. The coupling flow path BR1 is formed on the X2 side with respect to the coupling flow path BK1 so as to extend in the Z-axis direction. The coupling flow path BK2 is formed on the X1 side with respect to the common flow path BB2 and on the Z2 side with respect to the common flow path BA2 so as to extend in the Z-axis direction ands communicate with the common flow path BA2. The coupling flow path BR2 is formed on the X2 side with respect to the common flow path BR1 and on the X1 side with respect to the coupling flow path BK2 so as to extend in the Z-axis direction. The nozzle flow path BN is formed between the coupling flow path BR1 and the coupling flow path BR2 so as to communicate with the common flow path BR1 and common flow path BR2 and communicate with the nozzle N corresponding to the nozzle flow path BN.

In the description below, the common flow path BA1 and common flow path BA2 may be collectively referred to as the common flow path BA; the common flow path BB1 and common flow path BB2 may be collectively referred to as the common flow path BB; the coupling flow path BK1 and coupling flow path BK2 may be collectively referred to as the coupling flow path BK; and the coupling flow path BR1 and coupling flow path BR2 may be collectively referred to as the coupling flow path BR.

As illustrated in FIGS. 3 to 5, the pressure chamber substrate 23 is disposed on the Z2 side with respect to the communication plate 22. The pressure chamber substrate 23 is a plate-like member that is elongated in the Y-axis direction and extends substantially in parallel to an XY plane. The pressure chamber substrate 23 is manufactured by, for example, using a semiconductor manufacturing technology to process a monocrystalline silicon substrate. In the manufacturing of the pressure chamber substrate 23, however, any known material and any known manufacturing method may be used.

In the pressure chamber substrate 23, flow paths for ink are formed. Specifically, in the pressure chamber substrate 23, M pressure chambers CV1 and M pressure chambers CV2 are formed in correspondence to the M nozzles N. The pressure chamber CV1 is formed on the Z2 side with respect to the coupling flow path BK1 and on the Z2 side with respect to the coupling flow path BR1 so as to extend in the X-axis direction and communicate with the coupling flow path BK1 and coupling flow path BR1. The pressure chamber CV2 is formed on the Z2 side with respect to the coupling flow path BK2 and on the Z2 side with respect to the coupling flow path BR2 so as to extend in the X-axis direction and communicate with the coupling flow path BK2 and coupling flow path BR2.

In the description below, the pressure chamber CV1 and pressure chamber CV2 may be collectively referred to as the pressure chamber CV.

In the description below, the coupling flow path BK1, the pressure chamber CV1 communicating with the coupling flow path BK1, the coupling flow path BR1 communicating with the pressure chamber CV1, the nozzle flow path BN communicating with the coupling flow path BR1, the coupling flow path BR2 communicating with the nozzle flow path BN, the pressure chamber CV2 communicating with the coupling flow path BR2, and the coupling flow path BK2 communicating with the pressure chamber CV2 may be collectively referred to as the individual flow path RK. In the description below, the individual flow path RK corresponding to an m-th nozzle N of the M nozzles N may be referred to as the individual flow path RK[m]. The variable m is a natural number greater than or equal to 1 and smaller than or equal to M. In this embodiment, the M individual flow paths RK[1] to RK[M] corresponding to the M nozzles N are placed in the Y-axis direction.

In this embodiment, it will be assumed as an example that all of the M individual flow paths RK[1] to RK[M] have substantially the same shape and substantially the same size. Here, the phrase “substantially the same” indicates not only completely the same shape and the same size but also that when an error of about 10% is taken into consideration, the M individual flow paths RK[1] to RK[M] can be regarded to have the same shape and the same size.

As illustrated in FIGS. 3 to 5, the vibration plate 24 is disposed on the Z2 side with respect to the pressure chamber substrate 23. The vibration plate 24 is a plate-like member that is elongated in the Y-axis direction and extends substantially in parallel to an XY plane. The vibration plate 24 can elastically vibrate. The vibration plate 24 has, for example, an elastic film formed from silicon oxide and an insulator film formed from zirconium oxide.

As illustrated in FIGS. 3 to 5, on the Z2 side with respect to the vibration plate 24, M piezoelectric elements PZ1 are provided in correspondence to the M pressure chambers CV1 and M piezoelectric elements PZ2 are provided in correspondence to the M pressure chambers CV2. In the description below, the piezoelectric element PZ1 and piezoelectric element PZ2 may be collectively referred to as the piezoelectric element PZ. The piezoelectric element PZ is a passive element that deforms in response to a change in the potential of the driving signal Com. Specifically, the piezoelectric element PZ is driven and deforms in response to a change in the potential of the driving signal Com. The vibration plate 24 vibrates by being triggered by the deformation of the piezoelectric element PZ. When the vibration plate 24 vibrates, pressure in the pressure chamber CV varies. When pressure in the pressure chamber CV varies, ink in the pressure chamber CV is discharged from the nozzle N through the coupling flow path BR and nozzle flow path BN.

As illustrated in FIGS. 3 to 5, the sealing substrate 25 is provided on the Z2 side with respect to the pressure chamber substrate 23 to protect the M piezoelectric elements PZ1 and M piezoelectric elements PZ2. The sealing substrate 25 is a plate-like member that is elongated in the Y-axis direction and extends substantially in parallel to an XY plane. The sealing substrate 25 is manufactured by, for example, using a semiconductor manufacturing technology to process a monocrystalline silicon substrate. In the manufacturing of the sealing substrate 25, however, any known material and any known manufacturing method may be used.

A recess that covers the M piezoelectric elements PZ1 and a recess that covers the M piezoelectric elements PZ2 are formed in the Z1-side surface of the two surfaces of the sealing substrate 25, the two surfaces having a normal in the Z-axis direction. A sealing space formed between the vibration plate 24 and the sealing substrate 25 so as to cover the M piezoelectric elements PZ1 will be referred to below as a sealing space SP1. Similarly, a sealing space formed between the vibration plate 24 and the sealing substrate 25 so as to cover the M piezoelectric elements PZ2 will be referred to below as a sealing space SP2. In the description below, the sealing space SP1 and sealing space SP2 may be collectively referred to as the sealing space SP. The sealing space SP seals the piezoelectric elements PZ to prevent them from being affected by moisture or the like and undergoing alteration.

A through-hole 250 is formed in the sealing substrate 25. The through-hole 250 is positioned between the sealing space SP1 and the sealing space SP2 when the sealing substrate 25 is viewed in the Z1 direction. The through-hole 250 extends from the Z1-side surface of the sealing substrate 25 to the Z2-side surface of the sealing substrate 25. The wiring board 4 is inserted into the through-hole 250.

As illustrated in FIGS. 3 to 5, the flow path forming substrate 26 is disposed on the Z2 side with respect to the communication plate 22. The flow path forming substrate 26 is a plate-like member that is elongated in the Y-axis direction and extends substantially in parallel to an XY plane. The flow path forming substrate 26 is manufactured by, for example, injection-molding a resin material. In the manufacturing of the flow path forming substrate 26, however, any known material and any known manufacturing method may be used.

In the flow path forming substrate 26, flow paths for ink are formed.

Specifically, in the flow path forming substrate 26, one common flow path BC1 and one common flow path BC2 are formed so as to extend in the Y-axis direction. The common flow path BC1 is formed on the Z2 side with respect to the common flow path BB1 so as to communicate with the common flow path BB1. The common flow path BC2 is formed on the Z2 side with respect to the common flow path BB2 and on the X2 side with respect to the common flow path BC1 so as to communicate with the common flow path BB2. In the description below, the common flow path BC1 and common flow path BC2 may be collectively referred to as the common flow path BC.

In the description below, the common flow path BA1, the common flow path BB1 communicating with the common flow path BA1, and the common flow path BC1 communicating with the common flow path BB1 may be collectively referred to as the common flow path R1. In the description below, the common flow path BA2, the common flow path BB2 communicating with the common flow path BA2, and the common flow path BC2 communicating with the common flow path BB2 may be collectively referred to as the common flow path R2. In the description below, the common flow path R1 and common flow path R2 may be collectively referred to as the common flow path R. The common flow path R1 is an example of a first common flow path, and the common flow path R2 is an example of a second common flow path.

At the flow path forming substrate 26, the coupling port H11 and coupling port H12, which communicate with the common flow path BC1, as well as the coupling port H21 and coupling port H22, which communicate with the common flow path BC2, are disposed.

Ink is supplied from the ink supply container 82 through the circulation flow path J11 and coupling port H11 to the common flow path R1 including the common flow path BC1. Part of the ink held in the common flow path R1 is collected in the ink supply container 82 through the circulation flow path J12 and coupling port H12. Similarly, ink is supplied from the ink supply container 82 through the circulation flow path J22 and coupling port H22 to the common flow path R2 including the common flow path BC2. Part of ink held in the common flow path R2 is collected in the ink supply container 82 through the circulation flow path J21 and coupling port H21.

Part of the ink supplied to the common flow path R1 is filled in the pressure chamber CV1 through the coupling flow path BK1. When the piezoelectric element PZ1 is driven in response to a driving signal Com, part of the ink filled in the pressure chamber CV1 is discharged from the nozzle N through the coupling flow path BR1. Part of the ink supplied to the pressure chamber CV1 is filled in the pressure chamber CV2 through the coupling flow path BR1, nozzle flow path BN, and coupling flow path BR2. When the piezoelectric element PZ2 is driven in response to a driving signal Com, part of the ink filled in the pressure chamber CV2 is discharged from the nozzle N through the coupling flow path BR2.

A through-hole 260 is formed in the flow path forming substrate 26. The through-hole 260 is positioned between the common flow path BC1 and the common flow path BC2 when the flow path forming substrate 26 is viewed in the Z1 direction. The through-hole 260 extends from the Z1-side surface of the flow path forming substrate 26 to the Z2-side surface of the flow path forming substrate 26. The wiring board 4 is inserted into the through-hole 260.

As illustrated in FIGS. 3 to 5, the wiring board 4 is mounted on the Z2-side surface of the two surfaces of the vibration plate 24, the two surfaces having a normal in the Z-axis direction. The wiring board 4 is a component that electrically couples the liquid discharging head 1 to the control device 7. A preferable example of the wiring board 4 is a flexible wiring board such as a flexible printed circuit (FPC) or flexible flat cable (FFC). An integrated circuit 40 is mounted on the wiring board 4. The integrated circuit 40 is an electric circuit that switches between supply and non-supply of a driving signal Com to the piezoelectric element PZ1 under control of the control signal SI.

As illustrated in FIGS. 3 to 5, the compliance sheet CS1 is disposed on the Z1 side with respect to the communication plate 22 and on the X1 side with respect to the nozzle substrate 21 so as to cover the common flow path BA1 and common flow path BB1. Similarly, the compliance sheet CS2 is disposed on the Z1 side with respect to the communication plate 22 and on the X2 side with respect to the nozzle substrate 21 so as to cover the common flow path BA2 and common flow path BB2. In the description below, the compliance sheet CS1 and compliance sheet CS2 may be collectively referred to as the compliance sheet CS. The compliance sheet CS is a plate-like member that is elongated in the Y-axis direction and extends substantially in parallel to an XY plane. The compliance sheet CS, which is formed from an elastic material, eliminates variations in the pressure of ink in the common flow path BA and coupling flow path BK.

Although not illustrated, the liquid discharging head 1 has a cap that seals a nozzle surface NP, which is the Z1-side surface of the two surfaces of the nozzle substrate 21, the two surfaces having a normal in the Z-axis direction. The cap seals the nozzle surface NP of the nozzle substrate 21, in which nozzles N are formed, during a period in which ink is not discharged from nozzles N.

4. Flows of Ink in the Liquid Discharging Head

Flows of ink in the liquid discharging head 1 will be described below with reference to FIGS. 6 and 7.

Figure 6:
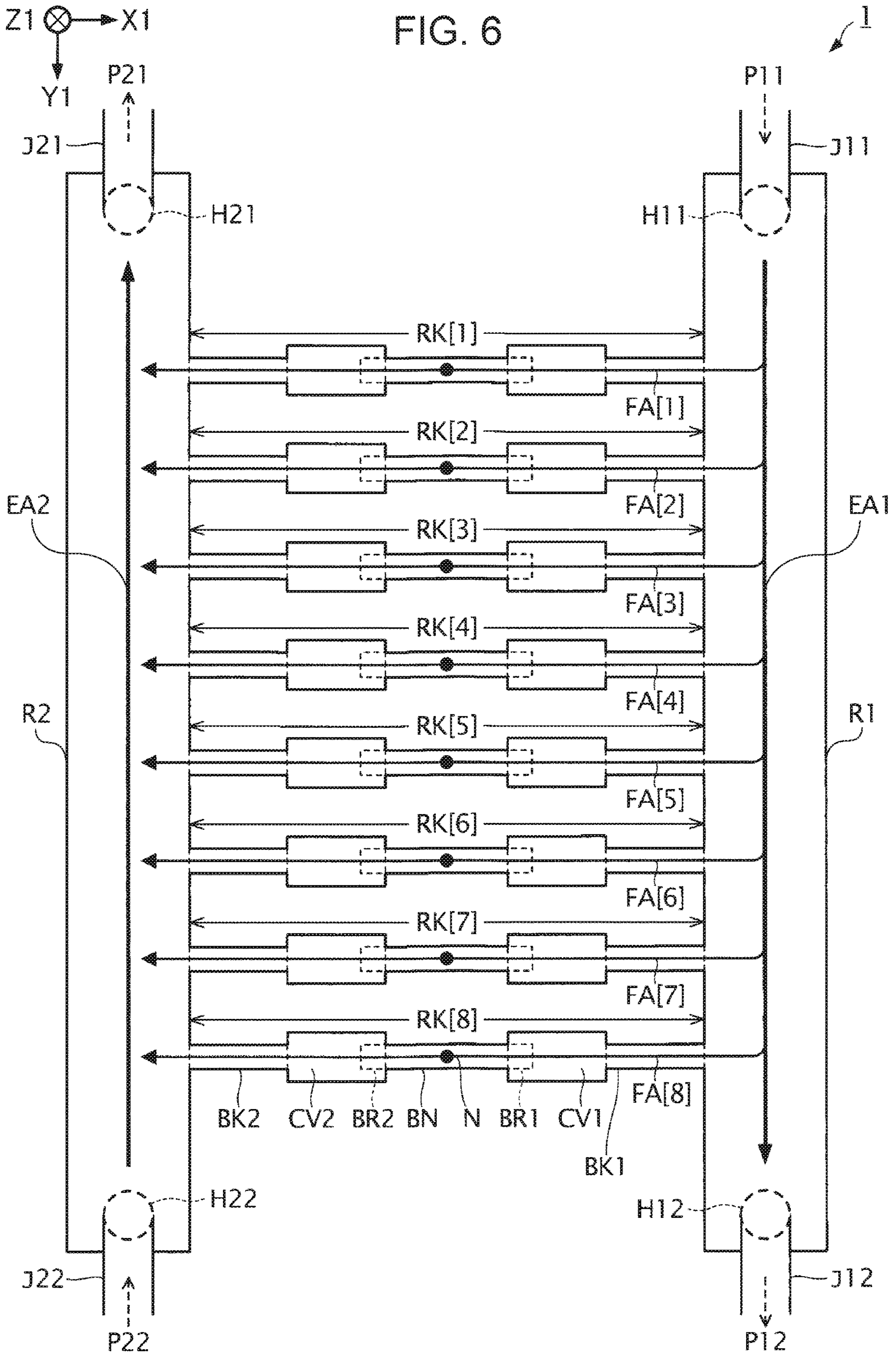
FIG. 6 is a plan view illustrating the example of the structure of the liquid discharging head.

FIG. 6 illustrates flows of ink in the liquid discharging head 1. Specifically, FIG. 6 illustrates flows of ink in the common flow path R and individual flow path RK when the liquid discharging head 1 is planarly viewed in the Z1 direction. In FIG. 6 and FIGS. 8 to 10, which will be referenced later, the coupling flow path BK is drawn so as to extend in the X-axis direction for convenience of illustration. However, in the liquid discharging head 1, the coupling flow path BK extends in the Z-axis direction. In FIG. 6 and FIGS. 8 to 10, which will be referenced later, the value M is assumed to be 8, as an example.

Through the circulation flow path J11, ink is supplied to the common flow path R1; through the circulation flow path J12, ink is collected from the common flow path R1; through the circulation flow path J22, ink is supplied to the common flow path R2; and through the circulation flow path J21, ink is collected from the common flow path R2; as illustrated in FIG. 6. Therefore, ink flows in the common flow path R1 in the Y1 direction as indicated by the arrow EA1; and ink flows in the common flow path R2 in the Y2 direction as indicated by the arrow EA2. In the individual flow path RK[m], ink is supplied from the common flow path R1 and ink is collected into the common flow path R2. In the individual flow path RK[m], therefore, ink flows from the common flow path R1 to the common flow path R2 in the X2 direction, as illustrated by the arrow FA[m].

Figure 7:
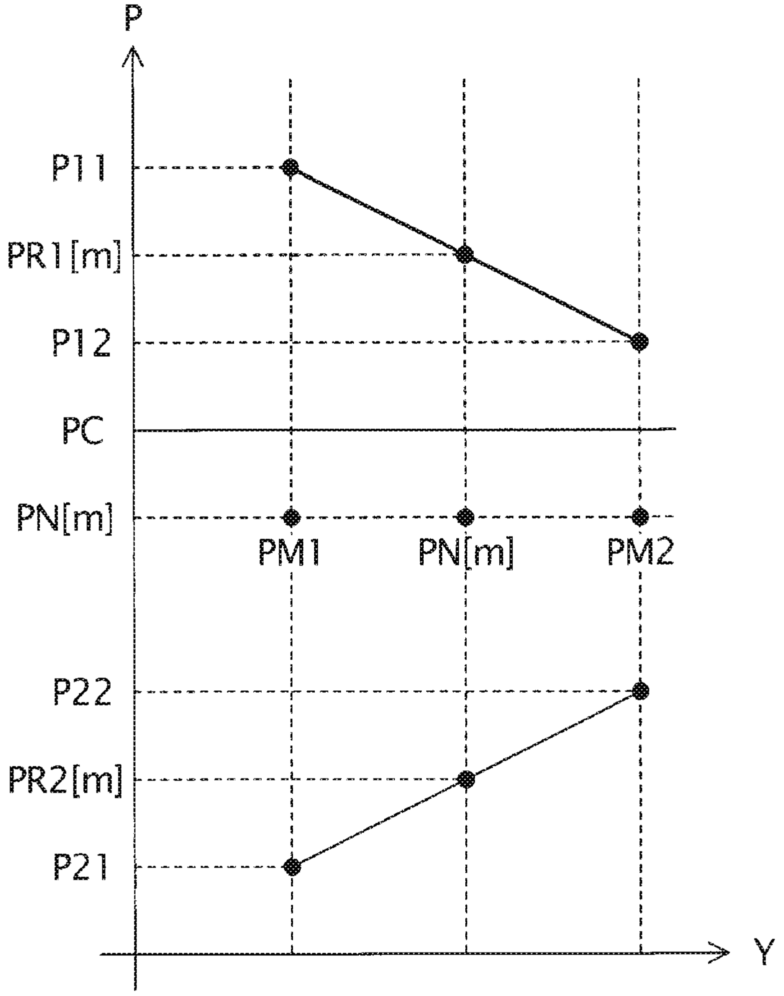
FIG. 7 is a graph illustrating an example of the pressure of ink in the liquid discharging head.

FIG. 7 illustrates a graph illustrating pressure to be applied to ink in the ink flow paths formed in the liquid discharging apparatus 100.

The control device 7 controls the pressure adjusting device 83 in the ink supply device 8 so that pressure P11 to be applied to ink in the circulation flow path J11, pressure P12 to be applied to ink in the circulation flow path J12, pressure P21 to be applied to ink in the circulation flow path J21, and pressure P22 to be applied to ink in the circulation flow path J22 satisfy a first condition defined by equations (1) and (2) below, as illustrated in FIG. 7.

First pressure condition $$P11>P12 \quad (1)$$

$$P22>P21 \quad (2)$$

Since, in this embodiment, pressures P11, P12, P21, and P22 satisfy the first pressure condition, it is possible to circulate ink in the common flow path R1 from the circulation flow path J11 to the circulation flow path J12 as indicated by the arrow EA1 and to circulate ink in the common flow path R2 from the circulation flow path J22 to the circulation flow path J21 as indicated by the arrow EA2. In this embodiment, therefore, it is possible to restrain ink in the common flow path R from becoming more viscous, unlike an aspect in which ink is not circulated in the common flow path R.

The control device 7 controls the pressure adjusting device 83 in the ink supply device 8 so that pressures P11, P12, P21, and P22 satisfy a second pressure condition defined by equations (3) and (4) below, as illustrated in FIG. 7.

Second pressure condition $$P11>P21 \tag{3}$$

$$P22>P22 \tag{4}$$

Since, in this embodiment, pressures P11, P12, P21, and P22 satisfy the second pressure condition, it is possible to circulate ink from the common flow path R1 through the individual flow path RK[m] to the common flow path R2 as indicated by the arrow FA[m]. Therefore, it is possible to smoothly supply ink to the pressure chamber CV disposed in the individual flow path RK[m].

The control device 7 controls the pressure adjusting device 83 in the ink supply device 8 so that pressures P11, P12, P21 and P22 and atmospheric pressure PC satisfy a third pressure condition defined by equations (5) and (6) below, as illustrated in FIG. 7.

Third pressure condition $$|P11-PC|<|P21-PC| \tag{5}$$

$$|P12-PC|<|P22-PC| \tag{6}$$

In this embodiment, the atmospheric pressure PC is standard atmospheric pressure, which is one atmosphere, that is, 101,325 pascals. However, the present disclosure is not limited to this type of aspect. The atmospheric pressure PC may be atmospheric pressure in a region in which the liquid discharging apparatus 100 is placed.

Since pressures P11, P12, P21, and P22 satisfy the second pressure condition and third pressure conditions, an atmospheric-pressure-related condition defined by equations (7), (8), (9), and (10) below holds between the atmospheric pressure PC and each of pressures P11, P12, P21, and P22.

Atmospheric-pressure-related condition $$P11>PC \tag{7}$$

$$P12>PC \tag{8}$$

$$PC>P21 \tag{9}$$

$$PC>P22 \tag{10}$$

That is, since, in this embodiment, pressures P11, P12, P21, and P22 satisfy the atmospheric-pressure-related condition, the above third pressure condition can also be represented as in equations (5A) and (6A) below.

Third pressure condition $$P11-PC<PC-P21 \tag{5A}$$

$$P12-PC<PC-P22 \tag{6A}$$

In the description below, pressure to be applied to ink in the vicinity of the nozzle N in the nozzle flow path BN in the individual flow path RK[m] may be referred to as nozzle vicinity pressure PN[m].

Since, in this embodiment, pressures P11, P12, P21, and P22 satisfy the third pressure condition, it is possible to make nozzle vicinity pressure PN[m] lower than the atmospheric pressure PC. Since, in this embodiment, nozzle vicinity pressure PN[m] is set to pressure lower than the atmospheric pressure PC, it is possible to restrain ink from leaking from the nozzle N except when ink in the pressure chamber CV is discharged from the nozzle N due to the driving of the piezoelectric element PZ.

The control device 7 controls the pressure adjusting device 83 in the ink supply device 8 so that pressures P11, P12, P21, and P22 satisfy a fourth pressure condition defined by equation (11) below, as illustrated in FIG. 7.

Fourth pressure condition $$P11+P21=P12+P22 \tag{11}$$

It will be assumed that the fourth pressure condition is satisfied not only when the sum of pressures P11 and P21 is completely equal to the sum of pressures P12 and P22 but also when the sum of pressures P11 and P21 is substantially equal to the sum of pressures P12 and P22.

Pressure to be applied to ink at a portion, in the common flow path R1, at which the portion is coupled to the individual flow path RK[m] will be referred to below as individual flow path vicinity pressure PR1[*m*]. Similarly, pressure to be applied to ink at a portion, in the common flow path R2, at which the portion is coupled to the individual flow path RK[m] will be referred to below as individual flow path vicinity pressure PR2[*m*]. In this embodiment, it will be assumed as an example that nozzle vicinity pressure PN[m] is represented as in equation (12) below by using individual flow path vicinity pressure PR1[*m*] and individual flow path vicinity pressure PR2[*m*].

$$PN[m]=\{PR1[m]+PR2[m]\}\div 2 \tag{12}$$

Since, in this embodiment, pressures P11, P12, P21, and P22 satisfy the fourth pressure condition, it is possible that M nozzle vicinity pressures PN[1] to PN[M] corresponding to the M individual flow paths RK[1] to RK[M] take substantially the same value. Specifically, when nozzle vicinity pressure PN[m] satisfies equation (12) above as in this embodiment, each of nozzle vicinity pressures PN[1] to PN[M] satisfies a nozzle pressure condition defined by equation (15) below by using average pressure PM1, indicated in equation (13) below, of pressures P11 and P21 and average pressure PM2, indicated in equation (14) below, of pressures P12 and P22.

Nozzle pressure condition $$PM1=\{P11+P21\}=2 \tag{13}$$

$$PM2=\{P12+P22\}=2 \tag{14}$$

$$PN[m]=PM1=PM2 \tag{15}$$

Although, in this embodiment, the nozzle pressure condition is defined by using equation (15) above, the present disclosure is not limited to this type of aspect. The nozzle condition may be defined as in, for example, equation (16) below.

Nozzle pressure condition $$PN[m]=\{P11+P12+P21+P22\}\cdot\div 4 \tag{16}$$

Thus, in this embodiment, it is possible that the M nozzles N corresponding to the M individual flow paths RK[1] to RK[M] can discharge ink with the nozzle pressure condition satisfied. Therefore, it is possible to reduce variations in characteristics in the discharging of ink from the M nozzles N corresponding to the M individual flow paths RK[1] to RK[M], unlike an aspect in which M nozzle vicinity pressures PN[1] to PN[M] take different values.

In this embodiment, the circulation flow path J11 communicates with the common flow path R1 at the Y2-side end of the common flow path R1 in the Y-axis direction, and the circulation flow path J12 communicates with the common flow path R1 at the Y1-side end of the common flow path R1 in the Y-axis direction, as illustrated in FIG. 6. In this embodiment, therefore, it is possible to restrain ink in the common flow path R1 from becoming more viscous, unlike an aspect in which, for example, the circulation flow path J11 communicates with the common flow path R1 at the central portion of the common flow path R1 in the Y-axis direction and the circulation flow path J12 communicates with the common flow path R1 at the central portion of the common flow path R1 in the Y-axis direction. In this embodiment, the Y-axis direction, that is, the Y1 direction and Y2 direction, is an example of a first direction; the Y1 side is an example of one side in the first direction; and the Y2 side is an example of another side in the first direction.

In this embodiment, the circulation flow path J21 communicates with the common flow path R2 at the Y2-side end of the common flow path R2 in the Y-axis direction, and the circulation flow path J22 communicates with the common flow path R2 at the Y1-side end of the common flow path R2 in the Y-axis direction, as illustrated in FIG. 6. In this embodiment, therefore, it is possible to restrain ink in the common flow path R2 from becoming more viscous, unlike an aspect in which, for example, the circulation flow path J21 communicates with the common flow path R2 at the central portion of the common flow path R2 in the Y-axis direction and the circulation flow path J22 communicates with the common flow path R2 at the central portion of the common flow path R2 in the Y-axis direction.

5. Conclusion in the Embodiment

As described above, the liquid discharging head 1 in this embodiment has: M individual flow paths RK placed in the Y-axis direction in correspondence to M nozzles N; a common flow path R1 communicating with one side of the M individual flow paths RK in common; a common flow path R2 communicating with another side of the M individual flow paths RK in common; a circulation flow path J11 communicating with the common flow path R1, ink being supplied to the common flow path R1 through the circulation flow path J11; a circulation flow path J12 communicating with the common flow path R1 more on the Y1 side than the circulation flow path J11 is, ink being collected from the common flow path R1 through the circulation flow path J12; a circulation flow path J22 communicating with the common flow path R2, ink being supplied to the common flow path R2 through the circulation flow path J22; and a circulation flow path J21 communicating with the common flow path R2 more on the Y2 side than the circulation flow path J22 is, ink being collected from the common flow path R2 through the circulation flow path J21.

Thus, in this embodiment, it is possible to circulate, in the common flow path R1, ink from the circulation flow path J11 to the circulation flow path J12 and to circulate, in the common flow path R2, ink from the circulation flow path J22 to the circulation flow path J21. In this embodiment, therefore, it is possible to restrain ink in the common flow path R1 and common flow path R2 from becoming more viscous, unlike so-called cavity circulation in which, for example, the common flow path R1 communicates with only the circulation flow path J11, the common flow path R2 communicates with only the circulation flow path J21, and ink supplied from the circulation flow path J11 to the common flow path R1 is collected from the circulation flow path J21 through the individual flow path RK and common flow path R2.

In this embodiment, ink in the common flow path R1 flows in the Y1 direction from the Y2 side toward the Y1 side and ink in the common flow path R2 flows in the Y2 direction from the Y1 side toward the Y2 side. In this embodiment, therefore, it is possible to reduce variations in pressure to be applied to ink in the vicinity of the M nozzles N corresponding to the M individual flow paths RK, unlike as aspect in which, for example, ink in the common flow path R1 and ink in the common flow path R2 flow in the same direction. Therefore, it is possible to reduce variations in characteristics in the discharging of ink from the M nozzles N corresponding to the M individual flow paths RK.

In the liquid discharging head 1 in this embodiment, the circulation flow path J11 communicates with the common flow path R1 at a Y2-side end in the Y-axis direction; the circulation flow path J12 communicates with the common flow path R1 at a Y1-side end in the Y-axis direction; the circulation flow path J22 communicates with the common flow path R2 at a Y1-side end in the Y-axis direction, and the circulation flow path J21 communicates with the common flow path R2 at a Y2-side end in the Y-axis direction.

In this embodiment, therefore, it is possible to restrain ink in the common flow path R1 from becoming more viscous, unlike an aspect in which, for example, the circulation flow path J11 communicates with the common flow path R1 at a central portion in the Y-axis direction and the circulation flow path J12 communicates with the common flow path R1 at the central portion in the Y-axis direction. It is also possible to restrain ink in the common flow path R2 from becoming more viscous, unlike an aspect in which, for example, the circulation flow path J22 communicates with the common flow path R2 at a central portion in the Y-axis direction and the circulation flow path J21 communicates with the common flow path R2 at the central portion in the Y-axis direction.

In the liquid discharging head 1 in this embodiment, pressure P11 to be applied to ink in the circulation flow path J11 is higher than pressure P12 to be applied to ink in the circulation flow path J12; and pressure P22 to be applied to ink in the circulation flow path J22 is higher than pressure P21 to be applied to ink in the circulation flow path J21.

In this embodiment, therefore, it is possible to circulate ink in the common flow path R1 from the circulation flow path J11 to the circulation flow path J12 and to circulate ink in the common flow path R2 from the circulation flow path J22 to the circulation flow path J21. In this embodiment, this can restrain ink in the common flow path R from becoming more viscous, unlike an aspect in which ink is not circulated in the common flow path R.

In the liquid discharging head 1 in this embodiment, pressure P11 to be applied to ink in the circulation flow path J11 is higher than pressure P21 to be applied to ink in the circulation flow path J21; and pressure P12 to be applied to ink in the circulation flow path J12 is higher than pressure P22 to be applied to ink in the circulation flow path J22.

In this embodiment, therefore, pressure to be applied to ink in the common flow path R1, to which the circulation flow path J11 and circulation flow path J12 are coupled, is higher than pressure to be applied to ink in the common flow path R2, to which the circulation flow path J22 and circulation flow path J21 are coupled. In this embodiment, this enables ink to be circulated from the common flow path R1 through the individual flow paths RK to the common flow path R2 and thereby enables ink to be smoothly supplied to the individual flow paths RK.

In the liquid discharging head 1 in this embodiment, the degree of the difference between the atmospheric pressure PC and pressure P21 to be applied to ink in the circulation flow path J21 is larger than the degree of the difference between the atmospheric pressure PC and pressure P11 to be applied to ink in the circulation flow path J11; and the degree of the difference between the atmospheric pressure PC and pressure P22 to be applied to ink in the circulation flow path J22 is larger than the degree of the difference between the atmospheric pressure PC and pressure P12 to be applied to ink in the circulation flow path J12.

In this embodiment, therefore, it is possible to set nozzle vicinity pressure PN[m], which is applied to ink in the vicinity of the nozzle N in the individual flow path RK[m], to a pressure lower than the atmospheric pressure PC. In this embodiment, this can restrain ink from leaking from the nozzle N.

In the liquid discharging head 1 in this embodiment, pressure P11 to be applied to ink in the circulation flow path J11 is higher than the atmospheric pressure PC; pressure P12 to be applied to ink in the circulation flow path J12 is higher than the atmospheric pressure PC; pressure P22 to be applied to ink in the circulation flow path J22 is lower than the atmospheric pressure PC; and pressure P21 to be applied to ink in the circulation flow path J21 is lower than the atmospheric pressure PC.

In this embodiment, therefore, pressure to be applied to ink in the common flow path R1, to which the circulation flow path J11 and circulation flow path J12 are coupled, is higher than pressure to be applied to ink in the common flow path R2, to which the circulation flow path J22 and circulation flow path J21 are coupled. In this embodiment, this enables ink to be circulated from the common flow path R1 through the individual flow paths RK to the common flow path R2 and thereby enables ink to be smoothly supplied to the individual flow paths RK.

In the liquid discharging head 1 in this embodiment, the sum of pressure P11 to be applied to ink in the circulation flow path J11 and pressure P21 to be applied to ink in the circulation flow path J21 is substantially equal to the sum of pressure P12 to be applied to ink in the circulation flow path J12 and pressure P22 to be applied to ink in the circulation flow path J22.

In this embodiment, therefore, it is possible to reduce variations in pressure to be applied to ink in the vicinity of the M nozzles N corresponding to the M individual flow paths RK, unlike an aspect in which there is a difference between the sum of pressure P11 and pressure P21 and the sum of pressure P12 and pressure P22. Therefore, it is possible to reduce variations in characteristics in the discharging of ink from the M nozzles N corresponding to the M individual flow paths RK.

The liquid discharging apparatus 100 in this embodiment has: the liquid discharging head 1; and the control device 7 that controls the pressure adjusting device 83 and outputs a control signal SI that controls the discharging of ink from the liquid discharging head 1, the pressure adjusting device 83 adjusting pressure P11 in the circulation flow path J11, pressure P12 in the circulation flow path J12, pressure P22 in the circulation flow path J22, and pressure P21 in the circulation flow path J21.

In this embodiment, therefore, it is possible to restrain ink in the R1 and common flow path R2 from becoming more viscous and to form an image on the medium PP by discharging ink from the liquid discharging head 1.

B. Variations

The embodiment exemplified above can be varied in various ways. Aspects of specific variations will be exemplified below. Any two or more aspects selected from the exemplary examples described below can be appropriately combined within a range in which any mutual contradiction does not occur.

Variation 1

In the above embodiment, ink may have the property that when shearing stress is exerted, the viscosity is lowered as in pseudoplasticity and thixotropy. In this case, a structure that exerts shearing stress on ink may be provided in the common flow path R1.

Figure 8:
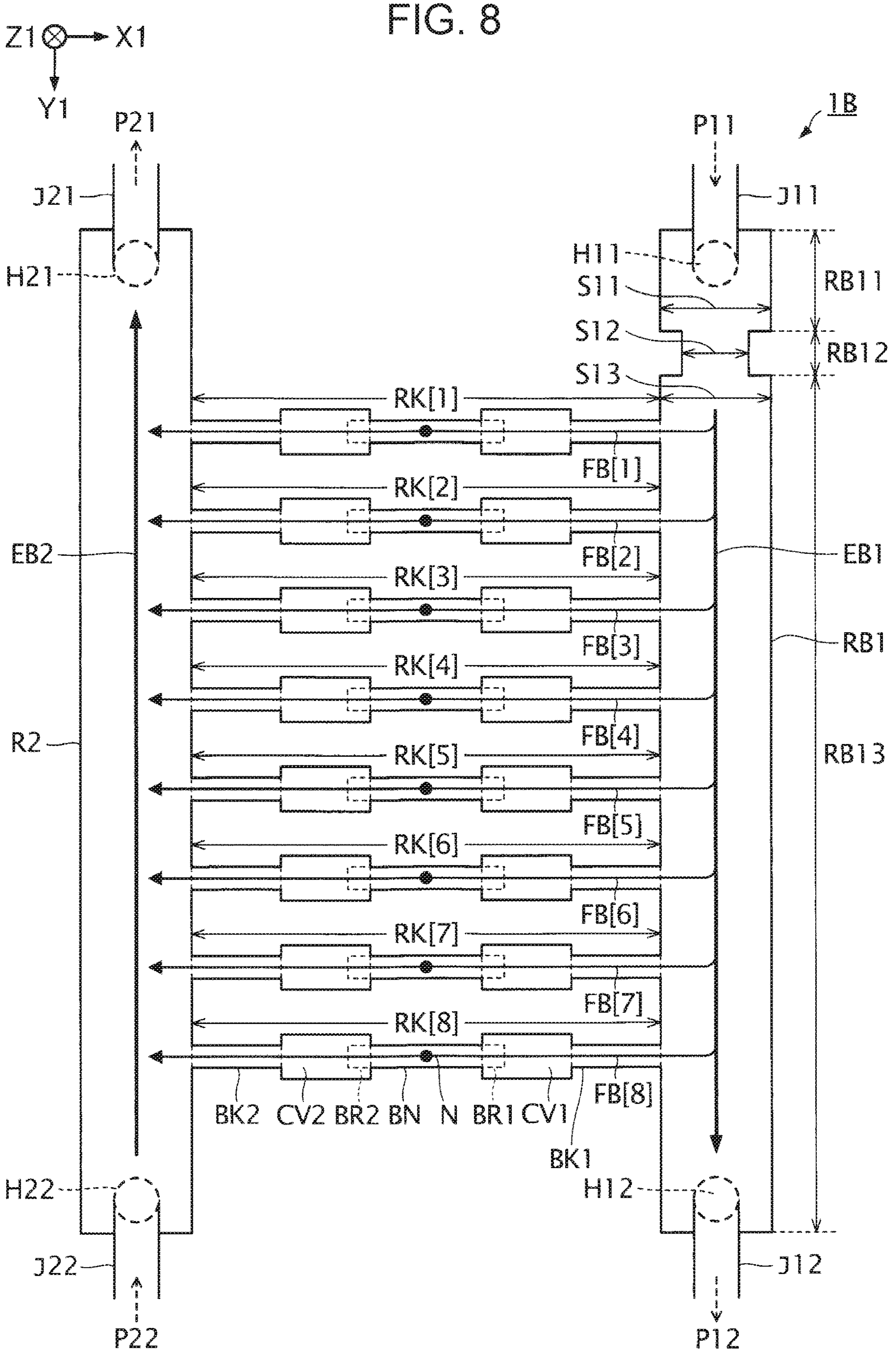
FIG. 8 is a plan view illustrating an example of the structure of a liquid discharging head in variation 1.

FIG. 8 is a plan view illustrating the structure of a liquid discharging head 1B in this variation. Specifically, FIG. 8 illustrates flows of ink in the liquid discharging head 1B when the liquid discharging head 1B is planarly viewed in the Z1 direction.

The liquid discharging head 1B differs from the liquid discharging head 1 in the embodiment in that the liquid discharging head 1B has a common flow path RB1 instead of the common flow path R1, as illustrated in FIG. 8. In the liquid discharging head 1B in this variation, ink flows in the common flow path RB1 in the Y1 direction as indicated by the arrow EB1; ink flows in the common flow path R2 in the Y2 direction as indicated by the arrow EB2; and ink flows in the individual flow path RK[m] in the X2 direction as indicated by the arrow FB[m].

The common flow path RB1 differs from the common flow path R1 in the embodiment in that the common flow path RB1 has a narrow portion RB12. Specifically, the common flow path RB1 has: a communication portion RB11 communicating with the circulation flow path J11; a common portion RB13 communicating with the M individual flow paths RK[1] to RK[M] and also communicating with the circulation flow path J12; and the narrow portion RB12 formed between the communication portion RB11 and the common portion RB13. The cross-sectional area S12 of the narrow portion RB12 is smaller than the cross-sectional area S11 of the communication portion RB11 and is also smaller than the cross-sectional area S13 of the common portion RB13.

In this variation, ink supplied from the circulation flow path J11 has pseudoplasticity or thixotropy. Therefore, when shearing stress is exerted on the ink, its viscosity is lowered.

That is, in this variation, when ink supplied from the circulation flow path J11 passes through the narrow portion RB12, shearing stress is exerted on the ink and its viscosity is lowered. In this variation, therefore, ink supplied from the circulation flow path J11 can smoothly circulate in the common flow path R1, individual flow path RK[m], and common flow path R2.

Variation 2

In the embodiment and variation 1 described above, it has been exemplified that all of the M individual flow paths RK[1] to RK[M] have substantially the same shape and substantially the same size. However, the present disclosure is not limited to this type of aspect. The M individual flow paths RK[1] to RK[M] may include one individual flow path RK and other individual flow paths RK having a shape different from the shape of the one individual flow path RK. The M individual flow paths RK[1] to RK[M] may also include one individual flow path RK and other individual flow paths RK having a size different from the size of the one individual flow path RK.

Figure 9:
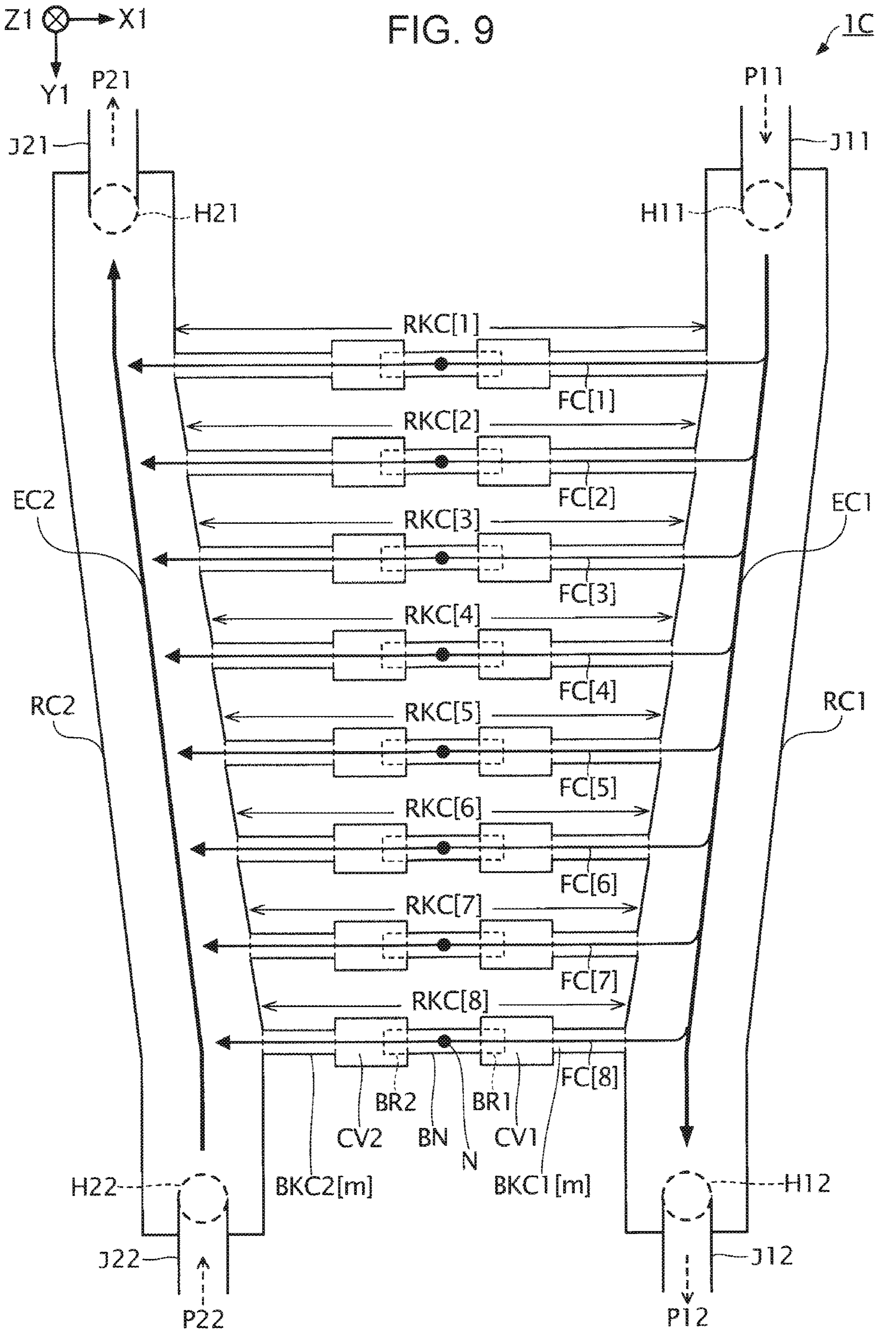
FIG. 9 is a plan view illustrating an example of the structure of a liquid discharging head in variation 2.

FIG. 9 is a plan view illustrating the structure of a liquid discharging head 1C in this variation. Specifically, FIG. 9 illustrates flows of ink in the liquid discharging head 1C when the liquid discharging head 1C is planarly viewed in the Z1 direction.

The liquid discharging head 1C differs from the liquid discharging head 1 in the embodiment in that the liquid discharging head 1C has a common flow path RC1 instead of the common flow path R1, has a common flow path RC2 instead of the common flow path R2, and has M individual flow paths RKC[1] to RKC[M] instead of the M individual flow paths RK[1] to RK[M], as illustrated in FIG. 9. The common flow path RC1 differs from the common flow path R1 in the embodiment in that the common flow path RC1 communicates with the M individual flow paths RKC[1] to RKC[M] instead of the M individual flow paths RK[1] to RK[M]. The common flow path RC2 differs from the common flow path R2 in the embodiment in that the common flow path RC2 communicates with the M individual flow paths RKC[1] to RKC[M] instead of the M individual flow paths RK[1] to RK[M]. In the liquid discharging head 1C in this variation, ink flows in the common flow path RC1 from the Y2 side toward the Y1 side as indicated by the arrow EC1; ink flows in the common flow path RC2 from the Y1 side toward the Y2 side as indicated by the arrow EC2; and ink flows in an individual flow path RKC[m] in the X2 direction as indicated by the arrow FC[m].

The individual flow path RKC[m] differs from the individual flow path RK[m] in the embodiment in that the individual flow path RKC[m] has a coupling flow path BKC1[*m*] instead of the coupling flow path BK1 and has a coupling flow path BKC2[*m*] instead of the coupling flow path BK2.

The individual flow paths RKC[1] to RKC[M] include an individual flow path RKC[m1] and an individual flow path RKC[m2]. The variable m1 is a natural number greater than or equal to 1 and smaller than m2. The variable m2 is a natural number greater than m1 and smaller than or equal to M. In this variation, the individual flow path RKC[m1] has a higher flow path resistance than the individual flow path RKC[m2]. Specifically, in this variation, a coupling flow path BKC1[*m*1] included in the individual flow path RKC [m1] is longer than a coupling flow path BKC1[*m*2] included in the individual flow path RKC[m2]. In this variation, a coupling flow path BKC2[*m*1] included in the individual flow path RKC[m1] is longer than a coupling flow path BKC2[*m*2] included in the individual flow path RKC[*m*2]. However, the present disclosure is not limited to this type of aspect.

For example, the coupling flow path BKC1[*m*1] may have a smaller cross-sectional area than the coupling flow path BKC1[*m*2], and the coupling flow path BKC2[*m*1] may have a smaller cross-sectional area than the coupling flow path BKC2[*m*2]. In this variation, the individual flow path RKC[m1] is an example of a first individual flow path, and the individual flow path RKC[m2] is an example of a second individual flow path.

In the example in FIG. 9 as well, pressure to be applied to ink at a portion, in the common flow path RC1, at which the portion is coupled to the individual flow path RKC[m] is referred to as individual flow path vicinity pressure PR1[*m*], as in the embodiment. Similarly, pressure to be applied to ink at a portion, in the common flow path RC2, at which the portion is coupled to the individual flow path RKC[m] is referred to as individual flow path vicinity pressure PR2[*m*].

In the example in FIG. 9, the difference between individual flow path vicinity pressure PR1[*m*1] and individual flow path vicinity pressure PR2[*m*1] is larger than the difference between individual flow path vicinity pressure PR1[*m*2] and individual flow path vicinity pressure PR2 [*m*2]. Therefore, when the individual flow path RKC[m1] and individual flow path RKC[m2] have substantially the same flow path resistance, the ink flow rate in the individual flow path RKC[m1] is higher than the ink flow rate in the individual flow path RKC[m2].

In this variation, however, the individual flow path RKC [m1] has a higher flow path resistance than the individual flow path RKC[m2]. In this variation, therefore, it is possible to make the ink flow rate in the individual flow path RKC[m1] and the ink flow rate in the individual flow path RKC[m2] approach each other, unlike an aspect in which the individual flow path RKC[m1] and individual flow path RKC[m2] have substantially the same flow path resistance. Thus, in this variation, it is possible to reduce variations in characteristics in the discharging of ink from the M nozzles N corresponding to the M individual flow paths RKC[1] to RKC[M], unlike an aspect in which the individual flow path RKC[m1] and individual flow path RKC[m2] have substantially the same flow path resistance.

Figure 10:
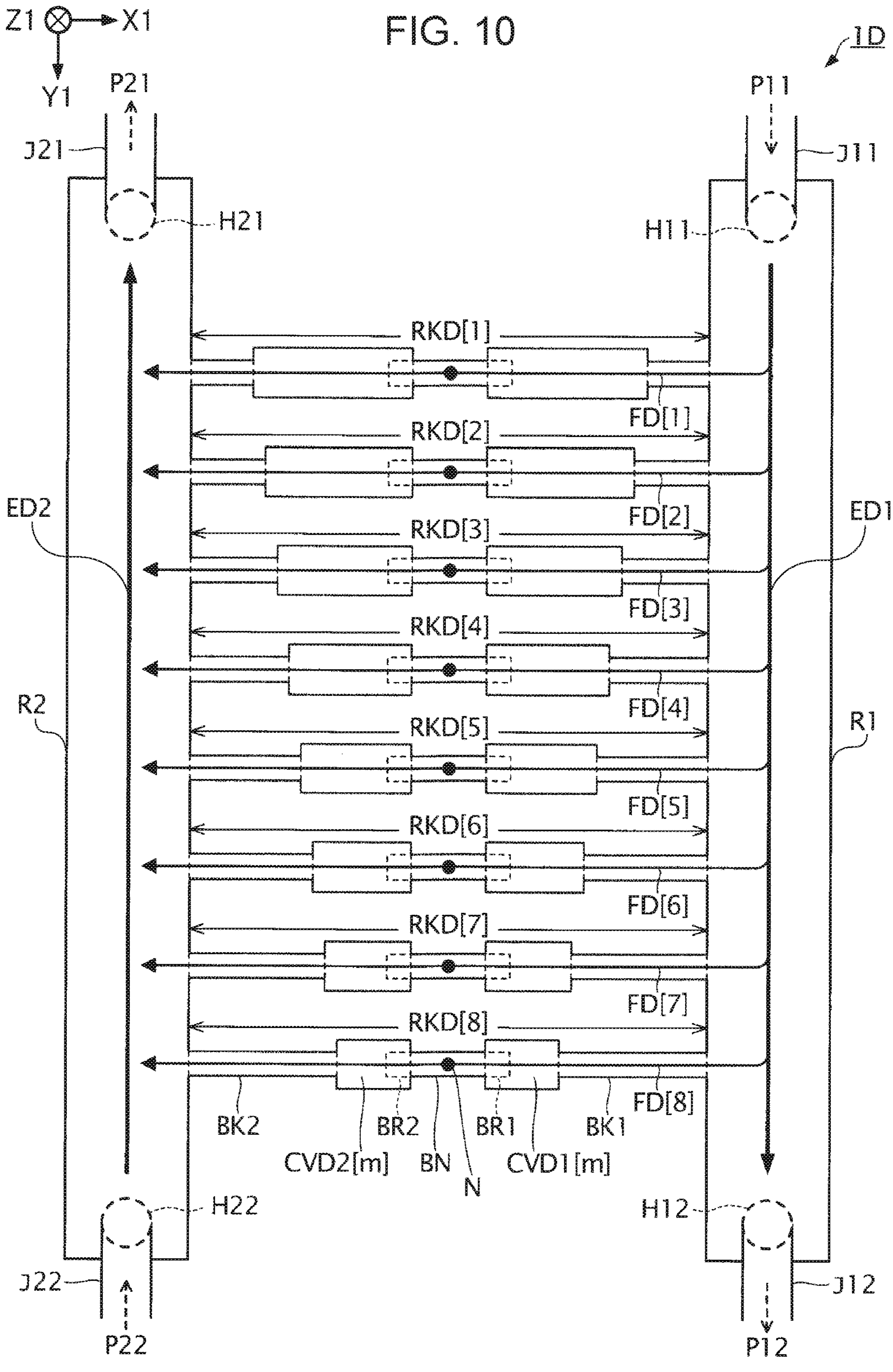
FIG. 10 is a plan view illustrating an example of the structure of another liquid discharging head in variation 2.

FIG. 10 is a plan view illustrating the structure of a liquid discharging head 1D in this variation. Specifically, FIG. 10 illustrates flows of ink in the liquid discharging head 1D when the liquid discharging head 1D is planarly viewed in the Z1 direction.

The liquid discharging head 1D differs from the liquid discharging head 1 in the embodiment in that the liquid discharging head 1D has individual flow paths RKD[1] to RKD[M] instead of the individual flow paths RK[1] to RK[M], as illustrated in FIG. 10. In the liquid discharging head 1D in this variation, ink flows in the common flow path R1 in the Y1 direction as indicated by the arrow ED1; ink flows in the common flow path R2 in the Y2 direction as indicated by the arrow ED2; and ink flows in an individual flow path RKD[m] in the X2 direction as indicated by the arrow FD[m].

The individual flow path RKD[m] differs from the individual flow path RK[m] in the embodiment in that the individual flow path RKD[m] has a pressure chamber CVD1 [*m*] instead of the pressure chamber CV1 and also has a pressure chamber CVD2[*m*] instead of the pressure chamber CV2.

The individual flow paths RKD[1] to RKD[M] include an individual flow path RKD[m1] and an individual flow path RKD[m2]. In this variable, a pressure chamber CVD1[*m*1] in the individual flow path RKD[m1] has a larger volume than a pressure chamber CVD1[*m*2] in the individual flow path RKD[m2], and a pressure chamber CVD2[*m*1] in the individual flow path RKD[m1] has a larger volume than a pressure chamber CVD2[*m*2] in the individual flow path RKD[m2]. However, the present disclosure is not limited to this type of aspect. For example, the individual flow path RKD[m1] may have a larger volume than the individual flow path RKD[m2]. In this variation, the individual flow path RKD[m1] is an example of the first individual flow path, and the individual flow path RKD[m2] is an example of the second individual flow path.

In the example in FIG. 10 as well, pressure to be applied to ink at a portion, in the common flow path R1, at which the portion is coupled to the individual flow path RKD[m] is referred to as individual flow path vicinity pressure PR1[*m*], as in the embodiment. Similarly, pressure to be applied to ink at a portion, in the common flow path R2, at which the portion is coupled to the individual flow path RKD[m] is referred to as individual flow path vicinity pressure PR2[*m*].

In the example in FIG. 10, the difference between individual flow path vicinity pressure PR1[*m*1] and individual flow path vicinity pressure PR2[*m*1] is larger than the difference between individual flow path vicinity pressure PR1[*m*2] and individual flow path vicinity pressure PR2 [*m*2]. Therefore, when the individual flow path RKD[m1] and individual flow path RKD[m2] have substantially the same volume, the ink flow rate in the individual flow path RKD[m1] is higher than the ink flow rate in the individual flow path RKD[m2].

In this variation, however, the individual flow path RKD [m1] has a larger volume than the individual flow path RKD[m2]. In this variation, therefore, it is possible to make the ink flow rate in the individual flow path RKD[m1] and the ink flow rate in the individual flow path RKD[m2] approach each other, unlike an aspect in which the individual flow path RKD[m1] and individual flow path RKD[m2] have substantially the same volume. Thus, in this variation, it is possible to reduce variations in characteristics in the discharging of ink from the M nozzles N corresponding to the M individual flow paths RKD[1] to RKD[M], unlike an aspect in which the individual flow path RKD[m1] and individual flow path RKD[m2] have substantially the same volume.

Variation 3

In variation 2 described above with reference to FIG. 9, it has been exemplified that the individual flow path RKC[m1] has a longer flow path length than the individual flow path RKC[m2]. However, the present disclosure is not limited to this type of aspect. When the individual flow path RKC[m1] and individual flow path RKC[m2] have the same flow resistance as described above, the ink flow rate in the individual flow path RKC[m1] is higher than the ink flow rate in the individual flow path RKC[m2].

In view of this, in this variation, the individual flow path RKC[m1] has a smaller cross-sectional area than the individual flow path RKC[m2] when viewed in the direction in which ink flows. Thus, the individual flow path RKC[m1] has a greater flow resistance than the individual flow path RKC[m2], so it is possible to reduce the difference in ink flow rate.

In this case, however, there is the fear that the flow path resistance of the individual flow path RKC[m2] becomes too low, in which case when the piezoelectric element PZ1 and piezoelectric element PZ2 are driven, pressure released toward the common flow path RC1 and common flow path RC2, but not toward the nozzle N, becomes large. This may lower the amount of discharging and other discharging properties. To solve this problem, the pressure chamber CV1 and pressure chamber CV2 in the individual flow path RKC[m2] may have a larger volume than the pressure chamber CV1 and pressure chamber CV2 in the individual flow path RKC[m1]. Alternatively, the piezoelectric element PZ1 and piezoelectric element PZ2 in the individual flow path RKC[m2] may have a larger size in an XY plane than the piezoelectric element PZ1 and piezoelectric element PZ2 in the individual flow path RKC[m1]. Alternatively, a driving voltage to be applied to the piezoelectric element PZ1 and piezoelectric element PZ2 in the individual flow path RKC[m2] may higher than a driving voltage to be applied to than the piezoelectric element PZ1 and piezoelectric element PZ2 in the individual flow path RKC[m1].

Variation 4

In the embodiment and variations 1 to 3 described above, it has been exemplified that a single individual flow path RK includes two pressure chambers denoted CV1 and CV2. However, the present disclosure is not limited to this type of aspect. A single individual flow path RK may include only a single pressure chamber CV.

Variation 5

In the embodiment and variations 1 to 4 described above, the liquid discharging apparatus 100 has been exemplified that is a serial liquid discharging apparatus in which the storage case 921 with liquid discharging heads 1 mounted in it is bidirectionally moved in the X-axis direction. However, the present disclosure is not limited to this type of aspect. The liquid discharging apparatus 100 may be a line liquid discharging apparatus in which a plurality of nozzles N are provided across the width of the medium PP.

Variation 6

The liquid discharging apparatus 100 exemplified in the embodiment and variations 1 to 5 described above can be applied not only to devices specific to printing but also to various other devices including a facsimile machine and a copying machine. Of course, applications of the liquid discharging apparatus 100 of the present disclosure are not limited to printing. For example, when the liquid discharging apparatus 100 is a type that discharges a color material solution, the liquid discharging apparatus 100 is used as a manufacturing apparatus that forms color filters for liquid crystal display devices. In another example, when the liquid discharging apparatus 100 is a type that discharges a conductive material solution, the liquid discharging apparatus 100 is used as a manufacturing apparatus that forms wires and electrodes on wiring boards.

What is claimed is:

1. A liquid discharging head comprising:

a plurality of individual flow paths placed in a first direction in correspondence to a plurality of nozzles that discharge a liquid;

a first common flow path communicating with one side of the plurality of individual flow paths in common;

a second common flow path communicating with another side of the plurality of individual flow paths in common;

a first flow path communicating with the first common flow path, the liquid being supplied to the first common flow path through the first flow path;

a second flow path communicating with the first common flow path more on one side in the first direction than the first flow path is, the liquid being collected from the first common flow path through the second flow path;

a third flow path communicating with the second common flow path, the liquid being supplied to the second common flow path through the third flow path; and a fourth flow path communicating with the second common flow path more on another side in the first direction than the third flow path is, the liquid being collected from the second common flow path through the fourth flow path, wherein a direction of flow of the liquid from the first flow path to the second flow path is opposite to a direction of flow of the liquid from the third flow path to the fourth flow path.

2. The liquid discharging head according to claim 1, wherein:

the first flow path communicates with the first common flow path at an end on the another side in the first direction;

the second flow path communicates with the first common flow path at an end on the one side in the first direction;

the third flow path communicates with the second common flow path at an end on the one side in the first direction; and the fourth flow path communicates with the second common flow path at an end on the another side in the first direction.

3. The liquid discharging head according to claim 1, wherein the first common flow path has:

a communication portion communicating with the first flow path;

a common portion communicating with the plurality of individual flow paths; and a narrow portion formed between the communication portion and the common portion, the narrow portion having a smaller cross-sectional area than the communication portion and the common portion.

4. The liquid discharging head according to claim 1, wherein when shearing stress is exerted on the liquid in the liquid discharging head, viscosity of the liquid is lowered.

5. The liquid discharging head according to claim 1, wherein:

pressure to be applied to the liquid in the first flow path is higher than pressure to be applied to the liquid ink in the second flow path; and pressure to be applied to the liquid in the third flow path is higher than pressure to be applied to the liquid ink in the fourth flow path.

6. The liquid discharging head according to claim 1, wherein:

pressure to be applied to the liquid in the first flow path is higher than pressure to be applied to the liquid ink in the fourth flow path; and pressure to be applied to the liquid in the second flow path is higher than pressure to be applied to the liquid ink in the third flow path.

7. The liquid discharging head according to claim 6, wherein:

a degree of a difference between atmospheric pressure and the pressure to be applied to the liquid in the fourth flow path is larger than a degree of a difference between the atmospheric pressure and the pressure to be applied to the liquid in the first flow path; and a degree of a difference between the atmospheric pressure and the pressure to be applied to the liquid in the third flow path is larger than a degree of a difference between the atmospheric pressure and the pressure to be applied to the liquid in the second flow path.

8. The liquid discharging head according to claim 6, wherein:

the plurality of individual flow paths include a first individual flow path, and a second individual flow path placed more on the one side in the first direction than the first individual flow path is; and the first individual flow path has a higher flow path resistance than the second individual flow path.

9. The liquid discharging head according to claim 6, wherein:

the plurality of individual flow paths include a first individual flow path, and a second individual flow path placed more on the one side in the first direction than the first individual flow path is; and the first individual flow path has a larger volume than the second individual flow path.

10. The liquid discharging head according to claim 1, wherein:

pressure to be applied to the liquid in the first flow path is higher than atmospheric pressure;

pressure to be applied to the liquid in the second flow path is higher than the atmospheric pressure;

pressure to be applied to the liquid in the third flow path is lower than the atmospheric pressure; and pressure to be applied to the liquid in the fourth flow path is lower than the atmospheric pressure.

11. The liquid discharging head according to claim 1, wherein a sum of pressure to be applied to the liquid in the first flow path and pressure to be applied to the liquid in the fourth flow path is substantially equal to a sum of pressure to be applied to the liquid in the second flow path and pressure to be applied to the liquid in the third flow path.

12. A liquid discharging apparatus comprising:

the liquid discharging head according to claim 1; and a control device that controls a pressure adjusting device and controls discharging of the liquid from the liquid discharging head, the pressure adjusting device adjusting pressure in the first flow path, pressure in the second flow path, pressure in the third flow path, and pressure in the fourth flow path.

* * * * *